Oct. 2, 1956     O. W. DAWSON     2,764,855
FIXTURE FOR POSITIONING TOOL RELATIVE TO GRINDING HEAD
Filed Jan. 29, 1953     3 Sheets-Sheet 1
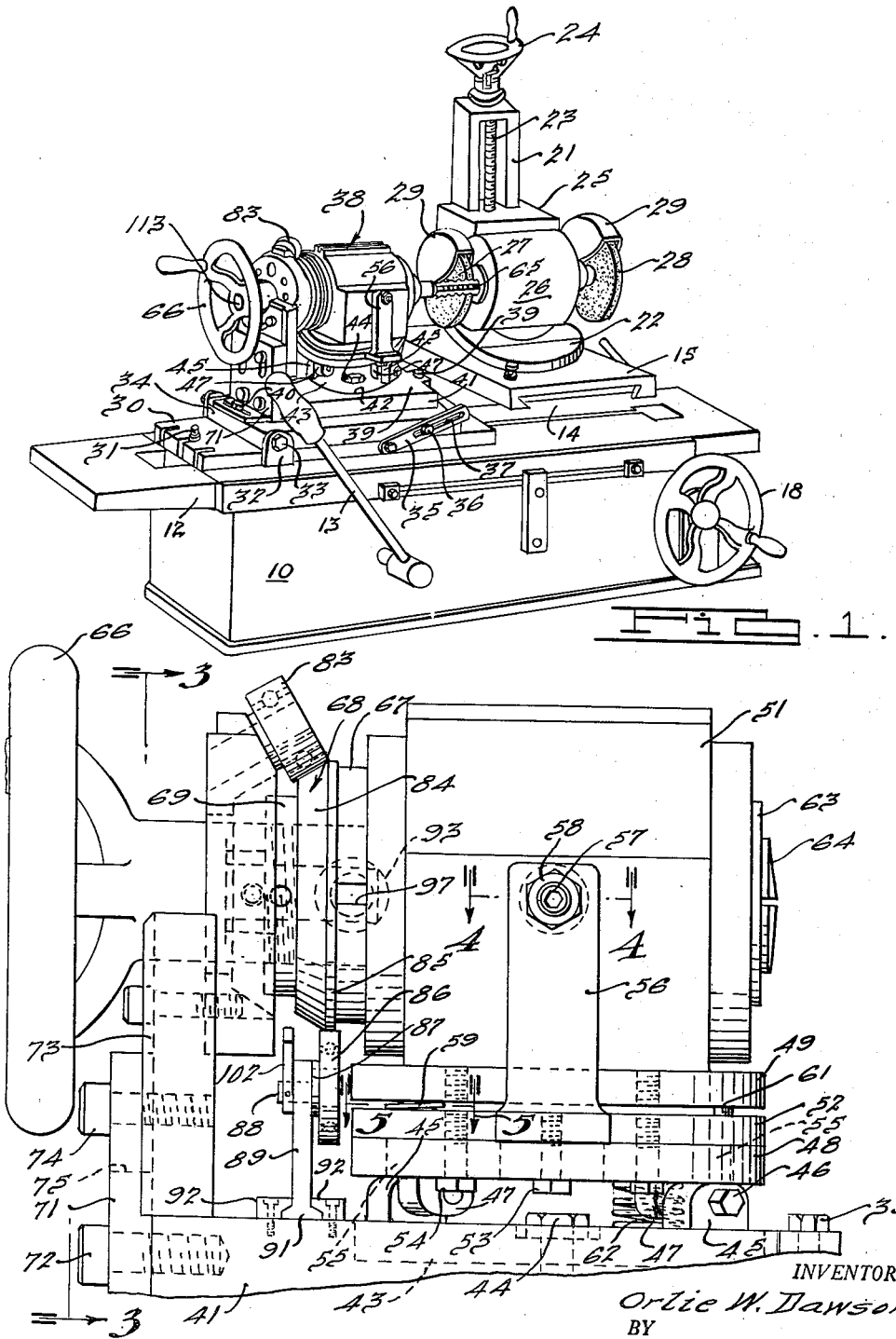
INVENTOR.
Orlie W. Dawson.
BY
Harness, Dickey & Pierce
ATTORNEYS.

Oct. 2, 1956     O. W. DAWSON     2,764,855
FIXTURE FOR POSITIONING TOOL RELATIVE TO GRINDING HEAD
Filed Jan. 29, 1953     3 Sheets-Sheet 2
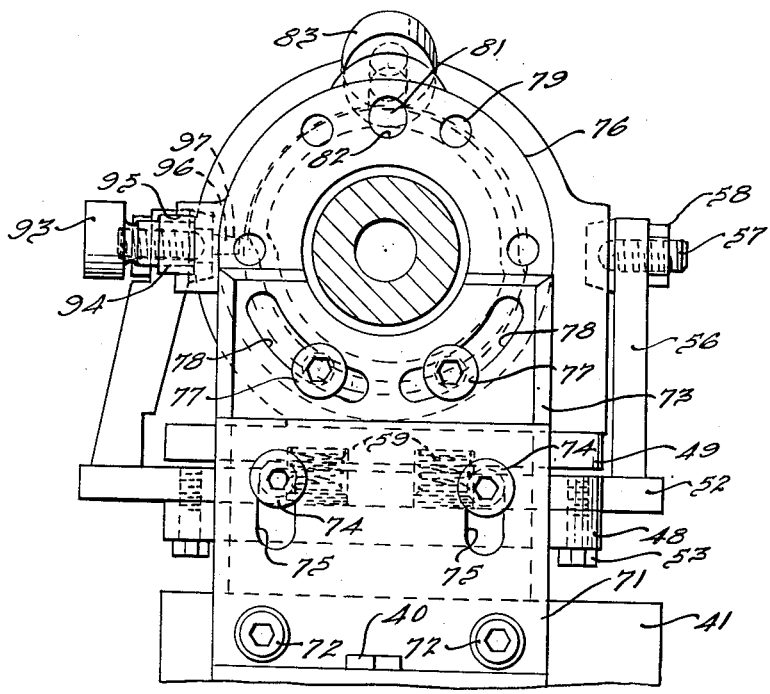
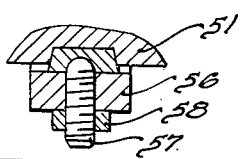
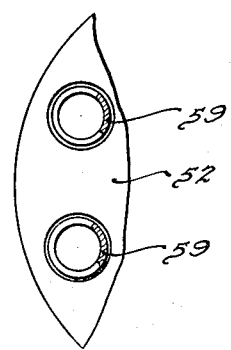
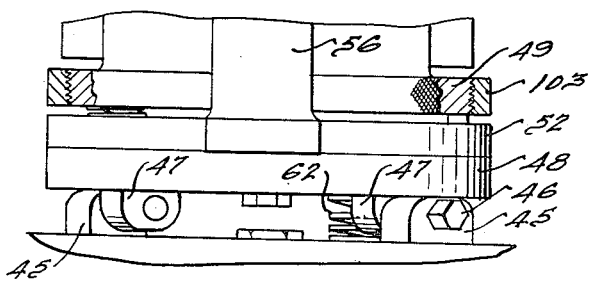
INVENTOR.
Ortie W. Dawson.
BY
Harness, Dickey & Pierce
ATTORNEYS.

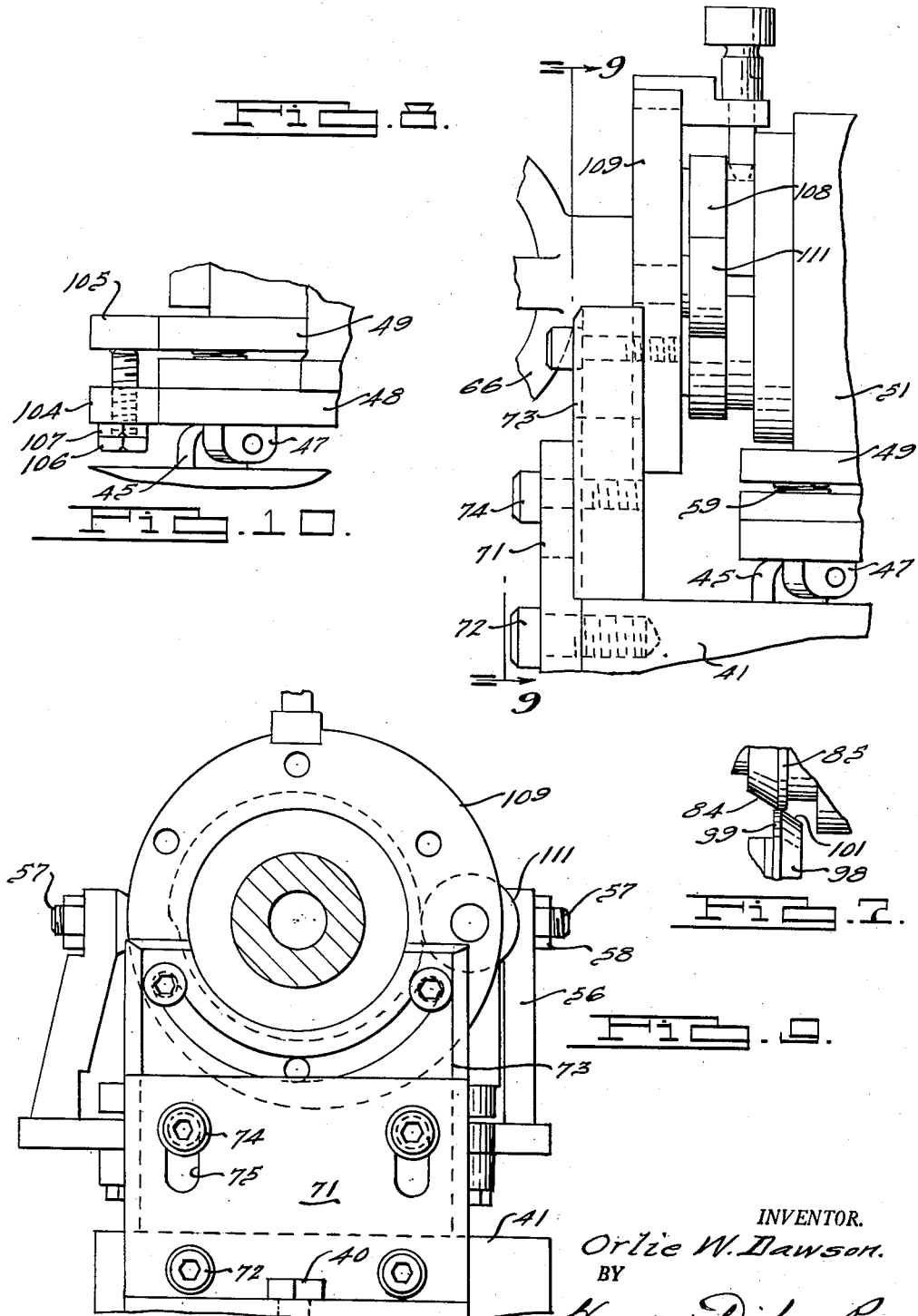

United States Patent Office 2,764,855
Patented Oct. 2, 1956

2,764,855

FIXTURE FOR POSITIONING TOOL RELATIVE TO GRINDING HEAD

Orlie Watson Dawson, Ferndale, Mich.

Application January 29, 1953, Serial No. 333,888

18 Claims. (Cl. 51—234)

This invention relates to tool supporting heads, and particularly to a head which supports a tool relative to a grinding wheel or other work-performing element for producing a predetermined movement of the tool relative thereto.

The invention pertains to a head similar to that illustrated, described and claimed in the patent to Orlie W. Dawson, No. 2,413,436, issued December 31, 1946. In this patent a head is disclosed for supporting a tool and for oscillating it toward and away from a grinding wheel radially and angularly of the axis of the tool. The head is provided with a cam against which a roller operates for oscillating the head in accordance with the number of cutting edges on the tool and the amount of relief to be provided thereto which corresponds to the number of cam surfaces on the cam. An angularly adjustable base plate supports the head on a movable table, the base plate having a trunnion thereon on which the head is angularly adjusted. By angularly adjusting the base plate and returning the head angularly to position the tool relative to the wheel, a forward and lateral tilting of the head occurs as the cam is rotated while engaged by the roller.

The present invention embodies the incorporation of additional structure to the head whereby the head may not only be tilted laterally and angularly but may also be provided with end motion to advance the tool axially during the grinding operation. This endwise movement of the tool is produced by the superimposing upon the forward tilting of the base plate a rearward tilting of the head, the result of which produces the axial movement of the tool, preferably with an upward component of movement. This forward movement of the tool is effected when the roller engages the top of an angle cam to produce a forward and downward movement to the rear end of the head as the base plate is tilted forwardly. When the roller is disposed at the right-hand side of the cam, right-hand relief is provided to the cutting edge, and when disposed on the left-hand side of the cam, left-hand relief is produced. By adjusting the roller on the right- or left-hand side above and below a horizontal plane through the axis of the head, the degree of relief may thereby be changed from substantially .015" to .065".

Accordingly, the main objects of the invention are: to provide a tool supporting head which is capable of producing a forward axial movement of a supported tool relative to the work-performing element; to provide a tool supporting head with a platform which is tiltable forwardly and downwardly on which the head is supported for tilting rearwardly and upwardly, the resulting movement of which advances the tool axially relative to the grinding wheel or other work-performing element; to provide a tool supporting head with an angularly adjustable base on which a platform is tiltably mounted for supporting the head in angularly adjustable and forwardly tilting position, the head having a cam engageable by a roller for producing the tilting movement to the head in a different manner, depending upon the position of the roller relative to horizontal and vertical planes through the axis of the head; to provide a head with interchangeable angularly and radially disposed cams and rollers which not only produces endwise movement to the tool along its axis but also movement radially of the axis and at any angle therebetween for dressing predetermined forms on the tool; and, in general, to provide a head for supporting a tool relative to a grinding wheel which is simple in construction, positive in operation and economical of manufacture.

Other objects and features of novelty of the invention will be specifically pointed out or will become apparent when referring, for a better understanding of the invention, to the following description taken in conjunction with the accompanying drawings, wherein:

Figure 1 is a perspective view of a grinding machine having a head thereon embodying features of the present invention;

Fig. 2 is an enlarged, broken view of the machine illustrated in Fig. 1, showing the head thereof;

Fig. 3 is a sectional view of the structure illustrated in Fig. 2, taken on the line 3—3 thereof;

Fig. 4 is a broken sectional view of the structure illustrated in Fig. 2, taken on the line 4—4 thereof;

Fig. 5 is an enlarged broken sectional view of the structure illustrated in Fig. 2, taken on the line 5—5 thereof;

Fig. 6 is a view of structure, similar to that illustrated in Fig. 2, showing a further form thereof;

Fig. 7 is a view of structure, similar to that illustrated in Fig. 2, showing another form thereof;

Fig. 8 is a broken view of structure, similar to that illustrated in Fig. 2, showing a further form which the invention may assume;

Fig. 9 is a sectional view of the structure illustrated in Fig. 8, and

Fig. 10 is a broken view of structure, similar to that illustrated in Fig. 2, showing a further form which the invention may assume.

The base 10 of the machine may be mounted on a bench or upon a pedestal and is provided with ways upon which the main platen 12 is reciprocated. An operating handle 13 extends from the side of the base 10 and is connected to the main platen 12 by a rack and pinion in such manner that the main platen 12 is moved along the ways through the manipulation of the handle 13. The base 10 supports a dovetailed element 14 upon which a platen 15 is mounted for movement between a forward and rearward supporting position. A handwheel 18 operates a lead screw which has threaded relation with a nut (not shown) on the platen 15 for adjusting it between the forward and rear positions thereof. The platen 15 has a motor riser frame 21 supported on a base 22 which is rotatably adjusted upon the platen 15. The frame 21 supports a lead screw 23 which is operated by a handwheel 24. The lead screw adjusts a grinding wheel supporting carriage 25 on the upright 21. A motor 26 is supported on the carriage 25 having extending shafts upon which grinding wheels 27 and 28 are suitably mounted and protected by guards 29.

The main platen 12 has a subbase 30 secured thereto by bolts 31 and a pair of bosses 32 are provided extending upwardly from the side edges of the subbase. Studs 33 project through the bosses 32 and have their ends extended into apertures in the side of a base 34 of a fixture which pivots on the studs when tilted upwardly. A pair of pivotal links 35 have studs 36 extending through slots 37 therein and into the base 34 for the purpose of clamping the base 34 in a horizontal or any angular position. A fixture 38, embodying features of the present invention, is secured to the base plate 34 by a forward screw 39 and a rear screw 40 disposed in a slot therein which permits the fixture to be set-off on an angle on the plate 34.

The fixture 38 has a base plate 41 provided with an annular recess 42 for receiving an annular base 43 for angular adjustment therein, about a central stud 44 which secures the base 43 in fixed position after adjustment. The base 43 has a pair of bosses 45 extending upwardly therefrom in which studs 46 are threaded in a manner to have the ends form trunnions engaging a pair of diametrically disposed bosses 47 on the bottom of an annular platform 48. The base 49 is spaced from the platform 48 so that an annular plate 52 may be disposed therebetween, being securable on the platform 48 for angular adjustment by a central screw 53. Clamping screws 54, threaded into the base 52, operate in slots 55 in the platform 48 to permit a degree of annular adjustment between the base 52 and the platform 48 before the two are clamped together by the screws 54. Similarly, the base 43 is angularly adjustable within the recess of the plate 41 and clamped in adjusted position by the screw 44. By relatively adjusting the angularity of the bases 43 and 52, a component of lateral tilting is produced to the head 38 when the head is advanced forwardly.

The plate 52 has a pair of standards 56 extending upwardly therefrom on opposite sides thereof and provided with trunnions 57 having clamping nuts 58 for tiltably supporting the casing 51 of the head in a vertical plane along the axis of the casing. A pair of springs 59 is provided between the base 49 of the casing 51 and the base 52 rearwardly of the standards 56 for providing pressure which urges the casing 51 to tilt forwardly. A stop 61 is provided on the base 52 on the forward side of the standards 56 for limiting the forward tilting movement of the casing. One or more springs 62 are provided on the forward side of the base 43, of substantially the same strength as the pair of springs 59, for applying a force which urges the paltform 48 to tilt rearwardly on the trunnions 46. In other words, the spring 62 tilts the platform 48 to the rear, while the springs 59 tilt the casing 51 forwardly in the opposite direction to the tilt of the platform 48. The casing 51 carries a rotatable sleeve 63, having a collet 64 therein which engages and supports a tool 65 in axial alignment with the casing 51. A handwheel 66 engages the sleeve 63 and produces the rotation thereof. An index plate 67 is fixed to the rear end of the sleeve 63, followed by a cam plate 68, all of which are locked in position by a nut 69. In such arrangement, the tool 65, the index plate 67, and the cam 68 are in fixed relation to each other and rotate as a unit.

Rearwardly of the base plate 41, a plate 71 is secured by screws 72 on which a plate 73 is secured by screws 74 extending through slots 75, for a purpose which will be explained hereinafter. The plate 73 has an annular supporting element 76 secured thereto by screws 77 extending in slots 78, permitting the element 76 to be adjusted angularly to any position. This is made possible by the provision of additional threaded apertures 79 which receive the bolts 77 through the slots 78, and in this manner the element 76 may be adjusted to any desired angular position. A stud 81 is disposed through an aperture 82 in the element 76 at an angle, herein illustrated as being approximately 30°, carrying a roller 83 which engages the cam surface 84 on the cam plate 68. The cam surface 84 is disposed at the same angle as the aperture 82, which is approximately 30°, so that the surface of the roller 83 engages the cam surface along a line of contact. It is to be understood that one or a number of like cam areas are provided on the cam surfaces depending upon the number of spiral flutes on the tool. A flat peripheral surface 85 on the cam plate 68 engages a roller 86 mounted on a shaft 87 which is eccentric to a supporting shaft 88. The supporting shaft 88 is journaled in a standard 89 having a base 91 which is secured in clamping ways 92 to permit the removal of the standard 89 and roller 86. The roller 86 prevents the downward tilting of the rear end of the casing 51 as the rising cam on the surface 84 forces the casing 51 forwardly as the platform 48 tilts clockwise on the trunnions so that the rear end of the casing is moving downwardly as the adjacent portion of the platform 48 is moving upwardly, producing a scissors type movement, the result of which carries the axis of the collet 64 and the tool therein along a straight line on the axis thereof. When the roller 83 contacts a low portion on the cam surface 84, the platform 48 tilts in a counterclockwise direction while the casing 51 tilts in a clockwise direction on the trunnions 46 and 57, respectively, thereby moving the casing to the left, as viewed in Fig. 2, along the axis of the collet 64 in substantially a straight-line movement.

An index plunger 93 is carried on the end of a bar 94 which is secured in a slot 95 in the periphery of the annular supporting element 76. The inner end of the plunger 93 is tapered at 96 to engage one of a plurality of slots 97 provided in the index plate 67. The index plate and plunger are employed for setting up the tool in timed relation to the cam plate. After the tool is adjusted in this manner so as to be timed with the cam surfaces of the cam plate, the plunger is then retracted, permitting the cam and plate to be rotated by the handwheel 66.

When the roller 83 is disposed on the top position as illustrated in the figures, a forward movement only will be provided to the tool so that a cylindrical surface will be ground along the tool surface. When the fixture 38 is set off at a slight angle and a degree of lateral movement is incorporated in the fixture by adjustment of the base plate 43, then the helical edges of a tool will have point contact with a flat face of the grinding wheel as the line of engagement of the tool portion beyond the cutting edge as it is advanced will produce a relief to the cutting edge. Thus, the fixture not only provides end movement along the axis of the tool, but various degrees of relief may be retained without changing the cam plate as was required heretofore.

When the roller 83 is moved 90° to the right of the top position and the base 52 adjusted relative to the platform, and the plate 43 adjusted relative to the base plate 41, an amount of lateral tilting will occur to the casing 51 and therefore to the tool, along with the forward movement of the tool. In this manner, the edge being ground by the wheel 27 may be relieved in the same manner as occurred when the fixture of the patent was employed, different degrees of relief being obtained, however, from a single cam plate. When the roller is advanced to the left, as illustrated in Fig. 3, from the top position to a position 90° therefrom, left-hand relief will be obtained to the cutting edge after the proper adjustment of the base and platform 52 and 48 and the base 43 in the recess plate 41. By positioning the roller when at the left- and right-hand positions above and below the 90° positions mentioned, the degree of relief may be changed from approximately .015″ to approximately .065″. By such adjustment, a greater or a lesser amount of relief may be provided to the cutting edge, without changing the cam plate as pointed out above.

In Fig. 7 a further form of roller, corresponding to roller 86, is illustrated, indicated by numeral 98. The roller 98 has a flattened surface 99 and a sloping surface 101 which may be the same as the sloping surface 84 on the cam plate 68. With this arrangement, the engagement between the flat surfaces 85 and 99 may be adjusted so that the tool will have a straight-forward motion for only a part of its travel and thereafter, during the engagement of the cam surface 101 with the surface 84, the rear portion of the casing 51 will drop downwardly so that the tool will move upwardly near the end of its travel. This will provide relief to the shoulder of a shouldered tool while the cutting edge of the pilot portion of the tool will move away from the grinding wheel. In this manner the cutting edge will not continuously be ground as would otherwise occur if the upward movement of the tool at the end of the grinding operation were not introduced. For this purpose it will be noted in Fig. 2 that the shaft 88 has a lever 102 secured thereto by which the eccentric portion 87 of the shaft, which supports the roller 86, is adjusted to lower the roller and thereby permit the downward tilting of the rear portion of the casing, which raises the tool in the manner above described. If a continuous controlled upward movement of the tool is desired throughout the time it is moved axially, then the camming surfaces 84 and 101 may be adjusted to be in engagement with each other throughout the entire movement of the cam surface with the roller 83, or cam drops may be provided on the flat peripheral surface 85 of the cam plate 68 diametrically opposite to the rising cam portions of the cam surface 84 thereof.

In Fig. 6 a modified form of the invention is illustrated, that wherein the base 49 may have threads thereon to which an internally threaded ring 103 is secured which may be adjusted downwardly to control the degree of tilt to the casing relative to the base 52 or for locking the casing fixed to the base 52 to prevent a forward tilting to the casing, and in this arrangement the same result would be had as if the base 52 and standard 56 were removed, as above mentioned.

In Fig. 10, a further form is illustrated, that wherein the platform 48 and the base 49 have lugs 104 and 105 thereon extending outwardly thereof in aligned relation. A stud 106 is threaded in the lug 104, having a lock nut 107 thereon for securing the stud after adjustment relative to the boss 105, to thereby control the degree of tilting to the casing 51.

When it is desired to obtain the lateral tilting of the casing without removing the base 52, or a number of different cam plates, a radial cam plate 108 may be substituted for the cam plate 68 and an eccentric plate 109 employed in place of the plate 76, as illustrated in Figs. 8 and 9. The plate 109 carries a roller 111 in engagement with the cam face on the cam plate 108, which thereby produces lateral tilt to the casing or a compound lateral and forward tilt thereto, depending upon the relative adjustment of the bases 43 and 52. In this arrangement, no direct axial movement of the tool occurs, and the structure is then employed to produce the lateral movement to the casing without removing the base 52 in a manner as referred to hereinabove.

A stop rod 113, illustrated in Fig. 1, is provided in the collet sleeve aligned with the axis thereof and adjustably supported for positioning the tool in the collet. The forward end of the rod may have a male or female center for accurately centering the inner end of the tool within the collet before being clamped thereby. It is to be understood that the collet and sleeve assembly is the same as that illustrated and described in the above-mentioned patent.

What is claimed is:

1. A head for supporting and adjusting a tool relative to a work performing element, said head having a base on which a platform is mounted for a clockwise tilting movement, a standard supported by said platform, a casing supported by said standard for tilting movement in a counterclockwise direction, means in said casing for supporting a tool, and cam means on said tool supporting means for tilting said casing lengthwise thereof as the platform is tilted in the opposite direction for producing a forward movement of the casing and tool along the axis thereof.

2. A head for supporting and adjusting a tool relative to a work performing element, said head having a base on which a platform is mounted for a clockwise tilting movement, a standard supported by said platform, a casing supported by said standard for tilting movement in a counterclockwise direction, means in said casing for supporting a tool, cam means on said tool supporting means for tilting said casing lengthwise thereof as the platform is tilted in the opposite direction for producing a forward movement of the casing and tool along the axis thereof, and means engaging said casing assembly for limiting the downward tilting of the casing as it tilts relative to the tilting of the platform so as to retain the casing axis in a horizontal plane at all times.

3. A head for supporting and adjusting a tool relative to a work performing element, said head having a base on which a platform is mounted for a clockwise tilting movement, a standard supported by said platform, a casing supported by said standard for tilting movement in a counterclockwise direction, means in said casing for supporting a tool, cam means on said tool supporting means for tilting said casing lengthwise thereof as the platform is tilted in the opposite direction for producing a forward movement of the casing and tool along the axis thereof, means engaging said casing assembly for limiting the counterclockwise tilting of the casing as it tilts relative to the tilting of the platform for retaining the axis of the casing in a horizontal plane for a portion of the forward travel of the casing, and means effective thereafter for permitting a controlled degree of counterclockwise tilting relative to the horizontal axis for raising the tool near the end of its forward advancing movement.

4. In a device for controlling the movement of a tool, a head having a rotatable collet therein for receiving the tool and having a cam with a rear sloping face on which a predetermined number of cam surfaces are provided and located in relation to said collet, trunnions for supporting said head for tilting movement lengthwise of the head, a platform for supporting said trunnions, means for mounting said platform for tilting movement in a direction opposite to that of said head, and a roller engaging said sloping face of said cam and tilting said head and said platform in opposite directions as the cam surfaces pass said roller when the collet is rotated, the result of which is a straight line movement of the tool along the axis thereof.

5. In a device for controlling the movement of a tool, a head having a rotatable collet therein for receiving the tool and having a cam with a rear sloping face on which a predetermined number of cam surfaces are provided and located in relation to said collet, trunnions for supporting said head for tilting movement lengthwise of the head, a platform for supporting said trunnions, means for mounting said platform for tilting movement in a direction opposite to that of said head, and a roller engaging said sloping face of said cam and tilting said head and said platform in opposite directions as the cam surfaces pass said roller when the collet is rotated, the result of which is a straight line movement of the tool along the axis thereof, said trunnions being angularly adjustable on said platform, said means for mounting said platform being angularly adjustable, the relative angular adjustments of the trunnion and platform producing a degree of lateral tilting movement to the axial movement of the tool.

6. In a device for controlling the movement of a tool, a head having a rotatable collet therein for receiving the tool and having a cam with a rear sloping face on which a predetermined number of cam surfaces are provided and located in relation to said collet, trunnions for supporting said head for tilting movement lengthwise of the head, a platform for supporting said trunnions, means for mounting said platform for tilting movement in a direction opposite to that of said head, a roller engaging said sloping face of said cam and tilting said head and said platform in opposite directions as the cam surfaces pass said roller when the collet is rotated, the result of which is a straight line movement of the tool along the axis thereof, said trunnions being angularly adjustable on said platform, said means for mounting said platform being angularly adjustable, the relative angular adjustments of the trunnion and platform producing a degree of lateral tilting movement to the axial movement of the tool, and means permitting said entire device to be adjusted vertically at an angle to a horizontal plane.

7. In a device for supporting and advancing a tool, a casing having means for supporting the tool and a cam for rotation thereon, means for supporting said casing for tilting movement lengthwise thereof, means for supporting said supporting means for tilting movement in a direction opposite to the tilting movement of said casing, and means engaging said cam for producing the simultaneous tilting movement of said casing and said first supporting means when the tool is rotated for advancing the tool axially.

8. In a device for supporting and advancing a tool, a casing having means for supporting the tool and a cam for rotation thereon, means for supporting said casing for tilting movement lengthwise thereof, means for supporting said supporting means for tilting movement in a direction opposite to the tilting movement of said casing, means engaging said cam for producing the simultaneous tilting movement of said casing and said first supporting means when the tool is rotated for advancing the tool axially, and means for engaging the casing assembly for controlling the tilting thereof and maintaining the casing with its axis in a horizontal plane at all times.

9. In a device for supporting and advancing a tool, a casing having means for supporting the tool and a cam for rotation thereon, means for supporting said casing for tilting movement lengthwise thereof, means for supporting said supporting means for tilting movement in a direction opposite to the tilting movement of said casing, means engaging said cam for producing the simultaneous tilting movement of said casing and said first supporting means when the tool is rotated for advancing the tool axially, means for engaging the casing assembly for controlling the tilting thereof and maintaining the casing with its axis in a horizontal plane at all times, and spring means between said casing and first supporting means and between said two supporting means for retaining the casing in desired position and for returning it to said position after movement.

10. In a device for supporting and advancing a tool, a casing having means for supporting the tool and a cam for rotation thereon, means for supporting said casing for tilting movement lengthwise thereof, means for supporting said supporting means for tilting movement in a direction opposite to the tilting movement of said casing, means engaging said cam for producing the simultaneous tilting movement of said casing and said first supporting means when the tool is rotated for advancing the tool axially, means for engaging the casing assembly for controlling the tilting thereof and maintaining the casing with its axis in a horizontal plane at all times, and spring means between said casing and first supporting means and between said two supporting means for retaining the casing in desired position and for returning it to said position after movement, said supporting means each being angularly adjustable.

11. In a device for supporting and advancing a tool, a casing having means for supporting the tool and a cam for rotation thereon, means for supporting said casing for tilting movement lengthwise thereof, means for supporting said supporting means for tilting movement in a direction opposite to the tilting movement of said casing, means engaging said cam for producing the simultaneous tilting movement of said casing and said first supporting means when the tool is rotated for advancing the tool axially, means for engaging the casing assembly for controlling the tilting thereof and maintaining the casing with its axis in a horizontal plane at all times, spring means between said casing and first supporting means and between said two supporting means for retaining the casing in desired position and for returning it to said position after movement, said supporting means each being angularly adjustable, and means permitting said device to be angularly adjustable as a unit relative to a work performing element.

12. In a device for supporting a tool, a base plate, an angularly adjustable base on said plate, a platform on said base, pivoted means joining said platform and base for permitting said platform to tilt, a base having trunnions thereon secured to said platform in angularly adjusted relation thereto, a tool supporting head pivotally secured to said trunnions for tilting movement thereon in a direction opposite to that of said platform, a rotatable sleeve mounted within said head, a collet at the front end of said sleeve for securing a tool therein, an index plate on the rear end of said sleeve, a cam on the rear end of said sleeve beyond said index plate, a plate carrying a roller and an index plunger supported on the base plate with the roller in engagement with said cam, a handwheel mounted on said sleeve for producing the rotation of the sleeve, the cam, the index plate and the collet, spring means provided between the head and base having the trunnions thereon rearwardly of the trunnions, and spring means provided between the platform and its supporting base forwardly of said trunnions.

13. In a device for supporting a tool, a base plate, an angularly adjustable base on said plate, a platform on said base, pivoted means joining said platform and base for permitting said platform to tilt, a base having trunnions thereon secured to said platform in angularly adjusted relation thereto, a tool supporting head pivotally secured to said trunnions for tilting movement thereon in a direction opposite to that of said platform, a rotatable sleeve mounted within said head, a collet at the front end of said sleeve for securing a tool therein, an index plate on the rear end of said sleeve, a cam on the rear end of said sleeve beyond said index plate, a plate carrying a roller and an index plunger supported on the base plate with the roller in engagement with said cam, a handwheel mounted on said sleeve for producing the rotation of the sleeve, the cam, the index plate and the collet, spring means provided between the head and base having the trunnions thereon rearwardly of the trunnions, spring means provided between the platform and its supporting base forwardly of said trunnions, and a roller engaging the rear of the head assembly for controlling the tilting thereof.

14. In a device for supporting a tool, a base, a tiltable support on said base having spaced standards thereon, a casing, means for pivotally supporting said casing on said standards, means for moving said casing longitudinally for causing said support and casing to tilt in opposite directions, and means for maintaining said casing parallel to all of its positions during said movement.

15. In a device for supporting a tool, a base, a tiltable support on said base having spaced standards thereon, a casing, means for pivotally supporting said casing on said standards, means for moving said casing longitudinally for causing said support and casing to tilt in opposite directions, means for maintaining said casing parallel to all of its positions during said movement, and a spring engaging said support in a position to oppose said tilting movement.

16. In a device for supporting a tool, a tiltable support having spaced standards thereon, a tool supporting head pivotally mounted on said standards, and means for moving said head along its longitudinal dimension and causing said support and standards to tilt in one direction and said head to tilt relative to said support and standards in the opposite direction so as to be maintained at all times parallel to its longitudinal dimension.

17. In a device for supporting a tool, a tiltable support having spaced standards thereon, a tool supporting head pivotally mounted on said standards, means for moving said head along its longitudinal dimension and causing said support and standards to tilt in one direction and said head to tilt relative to said support and standards in the opposite direction so as to be maintained at all times parallel to its longitudinal dimension, and a spring engaging said support in a position to oppose said tilting movement.

18. In a device for supporting a tool, a base, a platform, pivot means on said base for supporting said platform for tilting movement, trunnions secured to said platform in angularly adjusted relation thereto, a tool supporting head pivotally secured to said trunnions for tilting movement lengthwise thereof, a rotatable sleeve mounted within said head, a collet at the front end of said sleeve for securing a tool therein, an index plate on the rear end of said sleeve, a cam on the rear end of said sleeve beyond said index plate, a roller in engagement with said cam, and a handwheel mounted on said sleeve for producing the rotation of the sleeve, the cam, the index plate and the collet to tilt the trunnions and platform and advance the head along the axis of said sleeve supported thereby in timed relation with the rotation of the cam.

References Cited in the file of this patent

UNITED STATES PATENTS

| | | |
|---|---|---|
| 1,402,473 | Bickford | Jan. 3, 1922 |
| 1,862,809 | Strong | June 14, 1932 |
| 2,413,436 | Dawson | Dec. 31, 1946 |
| 2,498,701 | Munro | Feb. 28, 1950 |
| 2,584,483 | McDonald et al. | Feb. 5, 1952 |
| 2,600,432 | Sanders | June 17, 1952 |